United States Patent [19]

Tabaru et al.

[11] Patent Number: 4,457,851
[45] Date of Patent: Jul. 3, 1984

[54] FERRITE MAGNET AND METHOD OF PRODUCING SAME

[75] Inventors: Kazunori Tabaru, Saitama; Noriyuki Noda, Kumagaya, both of Japan

[73] Assignee: Hitachi Metals, Ltd., Tokyo, Japan

[21] Appl. No.: 335,546

[22] Filed: Dec. 29, 1981

[51] Int. Cl.³ ............................................. B06B 1/02
[52] U.S. Cl. .................................. 252/62.63; 264/24; 264/63; 264/176 R
[58] Field of Search ........................... 264/24, 63, 67; 252/62.56, 62.63

[56] References Cited

U.S. PATENT DOCUMENTS 3,114,715 12/1963 Brockman ............................ 264/24
4,057,606 11/1977 Kobayashi ........................... 264/63

FOREIGN PATENT DOCUMENTS 51-62396 5/1976 Japan ................................... 264/24

Primary Examiner—John Parrish
Attorney, Agent, or Firm—Antonelli, Terry & Wands

[57] ABSTRACT

A ferrite magnet and a method of producing same, wherein a mixture of magnetoplumbite type ferrite particles contained as its principal constituent and at least one of a mixing medium, an organic binder and a minute particular additive which is added with water or methyl alcohol is subjected to extrusion compacting to form compacts. The formed compacts are each subjected to at least drying, sintering, orienting and magnetizing, to produce cylindrical ferrite magnets having a plurality of magnetic poles on the surface. To impart anisotropy to the magnets, at least one pulse magnetic field may be applied on the surface of each compact formed by extrusion compacting, and the oriented compact may be magnetized in the same direction as the direction in which the anisotropy has been imparted.

15 Claims, 11 Drawing Figures

FERRITE MAGNET AND METHOD OF PRODUCING SAME

BACKGROUND OF THE INVENTION

1. Field of the Invention

This invention relates to a ferrite magnet suitable for use in electronic copying apparatus, audio equipment, rotary machines, etc., and a method of producing such ferrite magnet by means of extrusion compacting.

2. Description of the Prior Art

Heretofore, a ferrite magnet used in speakers, small DC motors, magnet type rotary machines, etc., has usually been produced by compacting, and when an anisotropic ferrite magnet of high magnetic properties is produced, magnetic field compacting in which compacting is carried out in the magnetic field has been in use. For compacting a cylindrical or columnar ferrite magnet of elongated type (having a length at least twice as large as the diameter) suitable for use as a magnet roll used in a developing device of an electronic copying apparatus, for example, what is generally referred to as a rubber press method is used which consists in compacting a ferrite magnet by applying pressure thereto at a right angle to the axis. Such magnet roll is described in specifications of U.S. Pat. Nos. 4,166,263, 4,168,481, 4,266,328, 4,167,718 and 4,169,998 (granted to Yamashita et al.). However, it is only an isotropic ferrite magnet that is produced by the rubber roll method.

In many applications, an ordinary magnet roll is required to have the magnetic properties of $Br \geq 3300$ G and of the magnetic flux density $Bo \geq 700$ G on the sleeve. In addition, it is also required that a compact size be obtained (having an outer diameter of below 24 mm) in a magnet roll. In the aforesaid rubber press method, however, difficulties would be experienced in obtaining improved uniformity of the magnet in a major axis direction because of the fact that compacting is carried out through a rubber mold. Another disadvantage in the rubber press method is that when sintered bodies of about 25 mm in diameter are ground to a size of about 24 mm in outer diameter, the Br is in the range 2000 and 2100 G at most because the ferrite magnet obtained in isotropic.

In one method known in the art for producing an anisotropic ferrite magnet, anisotropy is imparted beforehand prior to compacting, as described in Japanese Patent Publication No. 47043/78, for example. Another known method is an extrusion compacting which is used for producing a cylindrical rubber magnet or a plastic magnet used in a small motor, for example. It is disclosed in Japanese Patent Application Laid-Open No. 75536/74 that an elongated cylindrical ferrite magnet for use as a magnet roll is produced by extrusion compacting.

The extrusion compacting methods referred to hereinabove have high forming efficiency, so that productivity can be greatly increased. Besides they are capable of imparting anisotropy to a certain degree to the magnet when it is produced, thereby enabling an improvement in magnetic properties to be expected. However, the ferrite magnet produced by the extrusion compacting methods of the prior art is unable to meet the properties as an anisotropic ferrite magnet. To obviate this disadvantage of the extrusion compacting methods of the prior art, it has been usual practice to carry out extrusion compacting in a magnetic field and it is proposed, as shown in Japanese Patent Publication No. 34192/72, to use a special nozzle in addition to the application of a magnetic field. Thus, compacting of a ferrite magnet in a magnetic field is generally practised to obtain an anisotropic ferrite magnet by extrusion compacting. One encounters the problems, when this method is used, that a static magnetic field of a current of a high value is required and hence the apparatus becomes large in size, and in addition the magnetic field must have a considerably high value of about 5000 G.

SUMMARY OF THE INVENTION

Object of the Invention

Accordingly the invention has as its object the provision of an anisotropic ferrite magnet and a method of producing same which enables such ferrite magnet to be readily produced by extrusion compacting by means of a simple apparatus.

STATEMENT OF THE INVENTION

The outstanding characteristic of the ferrite magnet and the method of producing same according to the invention is that there is provided, in a ferrite magnet and a method of producing same wherein a mixture composed of magnetic particles of the magnetoplumbite type which are the principal component, a mixing medium, an organic binder and a minute particular additive which are added when necessary is subjected to extrusion compacting to form a compact which is then dried and sintered to obtain a ferrite magnet, the feature that anisotropy is imparted to the compact by applying a pulse magnetic field on its surface and then the compact is magnetized in the same direction as the direction in which the anisotropy is imparted, following drying and sintering.

DESCRIPTION OF THE PREFERRED EMBODIMENTS

Process steps of the method of producing an anisotropic ferrite magnet according to the invention will be described.

Figure 1A:
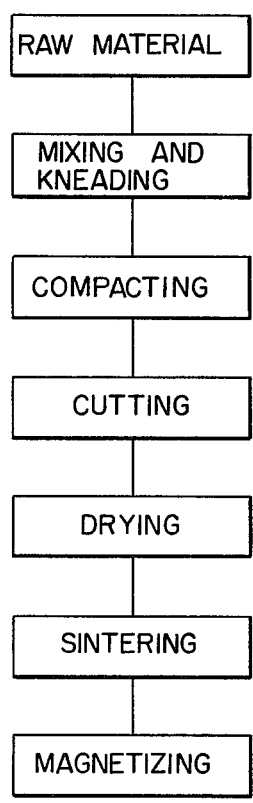
FIGS. 1(a) and 1(b) are flow charts in explanation of the process steps for producing a ferrite magnet by a method of the prior art and the method according to the invention, respectively.

Generally, in producing a ferrite magnet by an extrusion compacting method, it is usual practice to knead as by a kneader a raw material comprising ferrite particles of the magnetoplumbite type added with one or two of an organic binder, a minute particular additive and a mixing medium, subject the kneaded mixture to extrusion compacting to obtain a compact, dry the produced compact, and magnetize the compact after being sintered, as shown in FIG. 1(a).

Figure 1B:
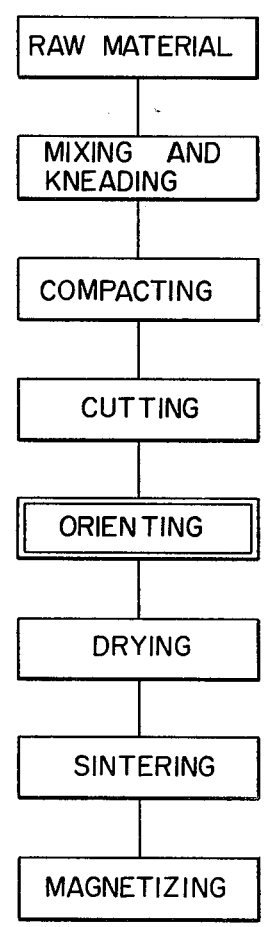

In the method according to the invention, as shown in FIG. 1(b), a raw material is kneaded as by a kneader, the kneaded mixture is subjected to extrusion compacting to produce a compact, a pulse magnetic field is applied on the surface of the obtained compact to impart anisotropy thereto, and an anisotropic ferrite magnet is obtained after the compact is dried, sintered and magnetized. It has been ascertained that the method of production according to the invention is capable of producing a ferrite magnet having its magnetic force increased by over about 40% as compared with a ferrite magnet produced by the method of the prior art shown in FIG. 1(a).

The method of production according to the invention will now be described in detail in the order of the process steps followed.

A. Preparation of Raw Material

Magnetoplumbite type ferrite particles are prepared as the main component of the raw material. When the ferrite particles are too small in particle size, their compactability is reduced; when they are too large in particle size, the density of sintered products is reduced and enough anisotropy is not obtained. Thus, their particle size is preferably in the range between about 0.7 and 1.5 $\mu$m in diameter. As is well known, the magnetoplumbite type ferrite particles have a crystal structure such that they have uniaxial magnetic anisotropy and they would be formed into scaly particles (particles of thin hexagonal plate shape) characterized by this crystal structure depending on the production method employed. Thus, when it is desired that ferrite magnets have particularly high magnetic properties, it is possible to obtain satisafactory anisotropic orientation of axes that facilitates magnetization in a compact when a pulse magnetic field is applied to on the compact, by virtue of the effect of the shape if such particles are used as ferrite particles. However, if the scaly particles alone are used as ferrite particles, the ferrite particles would have their compactability reduced, aso that it is preferred to increase the amount of the mixing medium, such as water or alcohol, or the organic binder. Alternatively, non-scaly particles which are ordinary ferrite particles may be added to the scaly particles. When this is the case, the proportion of the scaly particles in all the ferrite particles is preferably in the range between 30 and 80 wt. %, or more preferably between 40 and 60 wt %, when the relation between magnetic properties and compactability is taken into consideration. However, the use of the scaly particles is disadvantageous from the points of view of cost and compactability, so that their use is not essential. It is possible to produce ferrite magnets of sufficiently high magnetic properties to be of practical value even if no scaly particles are used.

By adding an organic binder, such as methyl cellulose, carboxymethylcellulose, etc., to the ferrite particles, it is possible to obtain improved compactability of the ferrite particles. However, if the amount of the added organic binder is too large, then cracks would tend to develop at the time sintering is carried out, so that its proportion with respect to the ferrite particles is preferably below about 2 wt %, or more preferably in the range between about 0.5 and 1.0 wt % to prevent crack formation at the time extrusion compacting is carried out.

By adding a minute particular additive which is an oxide, such as PbO, CaO or $SiO_2$ that produces vitreous material to the ferrite particles in an amount of about 0.1–3 wt % with respect thereto, it is possible to increase the density of the sintered body to thereby improve magnetic properties.

To obtain improved compactability, a mixing medium, such as water and alcohol, may be added to the ferrite particles. If the amount of the mixing medium is too small, then viscosity would become too high to allow imparting of anisotropy to be achieved satisfactorily by the effect of reduction in area at the time extrusion compacting is carried out and the density of the compact would tend to have local variations which are likely to cause crack formation to take place after the compact is sintered; if it is too large, then the compact would develop cracks when it is dried or high density would become unobtainable when extrusion compacting is carried out. Thus, the range of the mixing medium is preferably between 10 and 30 wt % with respect to the ferrite particles.

Thus, after adding an organic binder and the like to the ferrite particles when necessary, they are thoroughly kneaded as by a kneader to obtain a raw material mixture.

B. Extrusion Compacting

Figure 2:
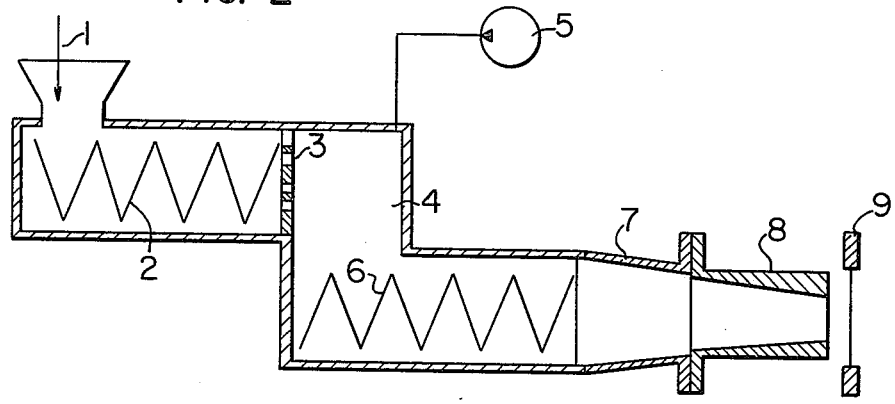
FIG. 2 ia a schematic sectional view of one example of the extrusion compacting machine used in the method of production according to the invention.

The raw material mixture described hereinabove is fed to a screw type extrusion compacting machine as shown in FIG. 2, to produce compacts of different types. The extrusion compacting process step is as follows. The mixture is fed to a hopper 1 and kneaded and compressed by a kneading screw 2. Then the mixture is shredded by a shredder 3 while a vacuum chamber 4 is evacuated by means of a vacuum pump 5 and the mixture in the vacuum chamber 4 is discharged by an extrusion screw 6 through a tapering barrel 7 and a metal mold 8, to produce a compact. The compact is cut by a cutter 9 at the outlet of the metal mold 8 to desired lengths.

The reduction in area at the time of extrusion compacting described hereinabove is generally expressed by So/S where So is the auger area of the extrusion compacting machine and S is the area of the outlet of the metal mold. By varying the reduction in area, it is possible to adjust the density of the compact. Preferably, the density of the compact is in the range between 2.5 and 3.2 g/cc in view of obtaining high magnetic density and preventing crack formation.

C. Orienting, Sintering and Magnetization of the Compact

To impart anisotropy of the compact obtained as described hereinabove, a pulse magnetic field may be applied to the compact as follows.

Figure 3:
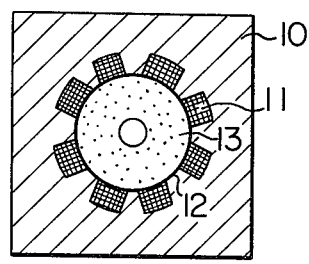
FIG. 3 is a sectional view of one example of the orienting means used in the method of production according to the invention.

(1) Orienting means as shown in FIG. 3 may be used for obtaining an elongated ferrite magnet of the cylindrical shape used in a magnet roll. The details of the orienting means shown in FIG. 3 are described in the U.S. patents granted to Yamashita et al. referred to hereinabove.

Referring to FIG. 3, a compact 13 is inserted into a yoke 10 formed of ferromagnetic material. The compact 13 is preferably covered with a protective member 12 formed of an insulating material, such as paper, cloth or vinyl compound sheet, or a conductor, such as aluminum, austenitic stainless steel, brass, etc, to avoid drying of the compact 13. Then a current is passed for an instant to a coil 11 in the yoke 10 to apply a pulse magnetic field to the compact 13. Application of the pulse magnetic fields causes deformation of the compact to take place so that the ferrite particles are oriented and converted into a polygonal shape having projecting magnetic pole portions.

To apply the pulse magnetic fields on the compact 13, the coil 11 may be connected to an instantaneous DC power source wherein an applied AC power source is used as an input and the AC current is rectified and raised to a predetermined DC voltage to charge a group of capacitors which effect discharge through thrystors. As for the magnitude of a pulse magnetic field, a magnetic field of over about 10 K Oe is enough to obtain normal anisotropic ferrite magnets. It goes without saying that not only one but also over two pulse magnetic fields may be applied.

Following orienting effected in this way, the compact is sintered and magnetized in the same direction as the direction in which anisotropy has been imparted, to produce an anisotropic ferrite magnet.

Figure 4:
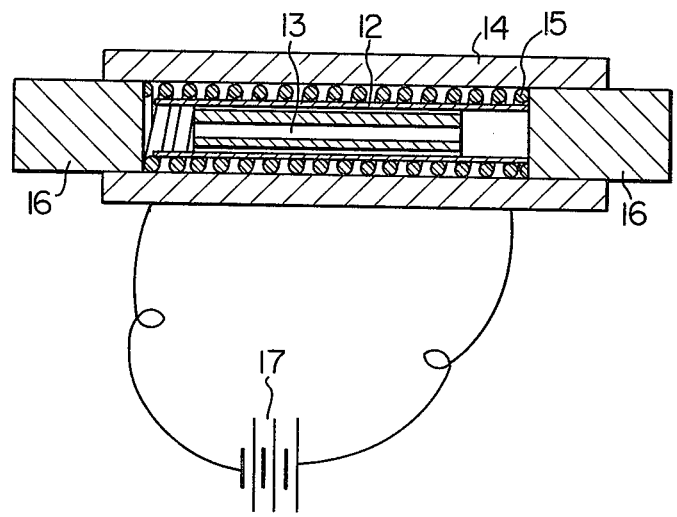
FIG. 4 is a vertical sectional view of another example of the magnetic orienting means used in the method of production according to the invention.

(2) To produce annular ferrite magnets mainly used in speakers, orienting means as shown in FIG. 4 may be used. In FIG. 4, a coil 15 is mounted on a cylindrical member 14 formed of ferromagnetic material and has inserted therein the elongated shape 13 of the cylindrical form covered with the protective member 12. The cylindrical member 14 is closed at either end thereof by a cover 16 made of iron. In the orienting means of the aforesaid construction, a current is passed from a pulse source, not shown, to the coil 15 to apply a pulse magnetic field in a direction parallel to the longitudinal axis of the compact 13 to impart anisotropy thereto. The compact 13 to which anisotropy has been imparted as aforesaid is sintered following drying, so as to produce annular magnets by cutting into predetermined lengths. By magnetizing the annular magnets in the same direction as the direction in which anisotropy is imparted, it is possible to produce anisotropic ferrite magnets of the annular shape.

By adjusting the amount of the mixing medium, it is possible to give rheological properties to the compact, so that the compact can be readily oriented by the orienting means of the aforesaid construction. However, since the compact has considerable viscosity, preferably a plurality of pulse magnetic fields are applied to obtain stable magnetic properties in the magnet. Application of a plurality of pulse magnetic fields, of course, improves magnetic properties.

Incidentally, in the foregoing description, the compact is cut into lengths after sintering, and this offers the advantage of being able to eliminate ginding. However, the invention is not limited to this treatment, and the compact may be cut into predetermined lengths following orienting and then subjected to drying and sintering, without any change in the magnetic properties of the ferrite magnet produced.

(3) In paragraphs (1) and (2) above, application of pulse magnetic fields is carried out prior to drying of the compact. However, when it is desired to give increased magnetic properties to ferrite magnets, pulse magnetic fields may be applied after an AC magnetic field has been applied to a compact beforehand. It would appear that application of an AC magnetic field causes the ferrite particles in the compact to vibrate, thereby extremely promoting the impartment of anisotropy to the compact.

D. Products

In the case of anisotropic ferrite magnets of the cylindrical shape magnetized to have a multiplicity of magnetic poles according to the invention, the Bo n their surfaces is over 1400 G when ground to have their diameters reduced by below 3 mm after effecting sintering. Further, the invention provides cylindrical ferrite magnets having more than two magnetic poles or 12, 24 and 36 magnetic poles, for example. Thus, the cylindrical ferrite magnets according to the invention can be used not only in magnet roll but also in stepping motors, for example.

[Modifications]

(1) In the foregoing description, a screw type extrusion compacting machine is used as means for carrying out extrusion compacting. However, the invention is not limited to this specific form of extrusion compacting machine and a plunger type extrusion compacting machine or an injection compacting machine may be used instead. Incidentally, the use of an injection compacting machine places limitations on the lengthwise dimension of a cylindrical magnet produced.

(2) The compact may have other configurations than the cylindrical shape, such as plate-like shape, arcuate-shape, etc., when the shape of the metal mold is varied.

[Effects]

The ferrite magnet and the method of producing same according to the invention can achieve the following effects:

(1) It is possible to produce an anisotropic ferrite magnet of improved magnetic properties by applying relatively low magnetic fields using a relativly small sized device as compared with conventional compacting in a magnetic field.

(2) The ferrite magnets produced may be of any shape and configuration, so that they have a wide range of applications.

(3) A static magnetic field of high cost requiring a current of a large value need not be used as means for imparting anisotropy, thereby greatly reducing production costs of anisotropic ferrite magnets.

EXAMPLE 1

A mixture of 7 kg of Ba-ferrite particles of a mean particle size of 1 $\mu$m, 70 kg each of CaO and $SiO_2$, 70 kg of carboxymethylcellulose and 1.5 kg of water was uniformly kneaded in a kneader of the batch type, and the kneaded mixture was fed to an extrusion compacting machine of the DE-150 type manufactured by Honda Iron Works. The compact obtained was cut at the outlet of the metal mold to obtain cylindrical compacts of 30 mm in outer diameter, 12 mm in inner diameter and 300 in length. Each of the compacts of the cylindrical form was covered with a vinyl compound sheet and fed to the orienting means shown in FIG. 3 to which was applied a pulse magnetic field of about 20 k Oe. After stripping the vinyl compound sheet off the surface of the compact, the compact was processed through the drying step, the sintering step in which the compact is sintered at 1200–1250° C. for 20 hours, the step of working on the outer circumference, and the step of magnetization carried out by using a magnetizing yoke. As a result, there is produced a ferrite magnet A of the cylindrical shape having an outer diameter of 22 mm.

A compact of the same dimensions as the compact described hereinabove obtained by extrusion compacting was dried, sintered, worked on its outer circumference in the same as described hereinabove without being oriented, to produce a cylindrical ferrite magnet B of 22 mm in outer diameter.

Measurements of the magnetic properties and the density of the sintered body were carried out for the ferrite magnets A and B. Table 1 shows the results obtained, in which C represents a ferrite magnet produced by using a rubber press process.

TABLE 1

| | Br (G) | IHc (Oe) | Density of Sintered Body |
|---|---|---|---|
| A | 2550 | 3400 | 5.2 |
| B | 2450 | 3100 | 4.9 |
| C | 2100 | 3000 | 4.8 |

From the results shown in Table 1, it will be appreciated that the ferrite magnet A according to the invention is superior to the ferrite magnets B and C in that the density of the sintered body is markedly improved and the values of Br and IHc each show a great increase.

Figure 5:
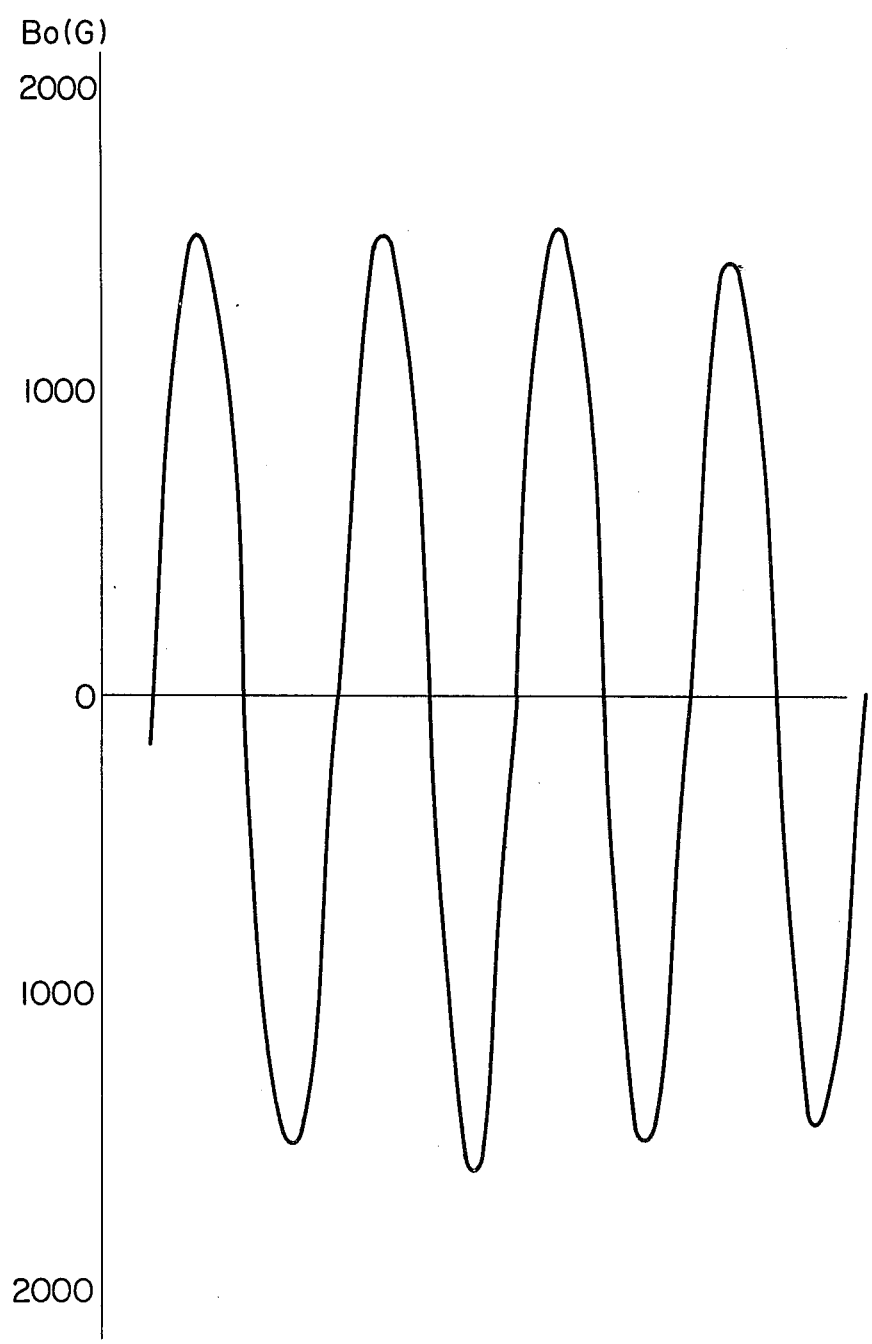
FIGS. 5 and 6 are graphs showing the distributions of magnetic flux density in ferrite magnets in a circumferential direction produced by the method according to the invention and a method of the prior art, respectively.
Figure 6:
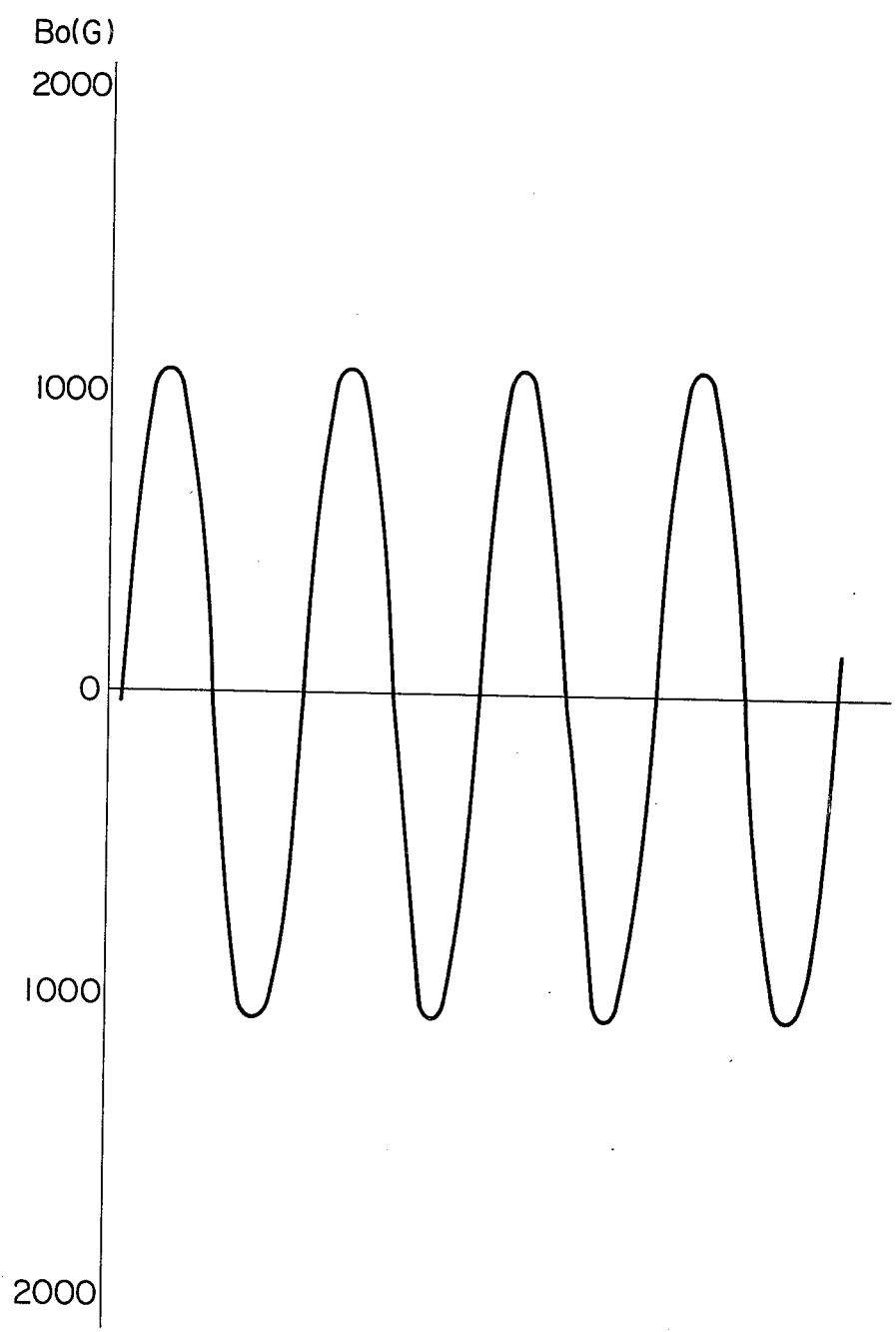

Magnetic flux density was measured circumferentially of the cylindrical ferrite magnets A and B. The results are shown in FIGS. 5 and 6, respectively. It will be seen that the ferrite magnet produced by extrusion compacting of the prior art has a magnetic force of about 1040 G, whereas the ferrite magnet produced by extrusion compacting according to the invention has a magnetic force of about 1500 G, representing an increase of about 44%. When the compact was inserted into a cylinder of aluminum instead of a vinyl compound, the results obtained were substantially similar to those described hereinabove.

Figure 7:
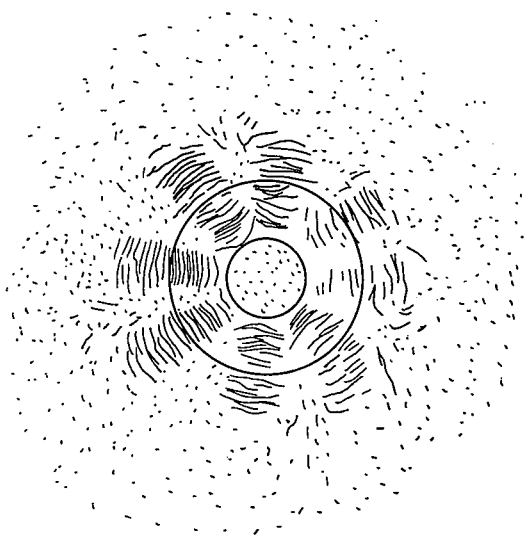
FIG. 7 is a view showing orientation of magnetic particles in the ferrite magnet produced by the method of production according to the invention.

When iron powder was spread on paper placed on the compact of the ferrite magnet A, the iron powder was oriented as shown in FIG. 7. Since the iron powder is arranged along the line of magnetic force, it will be apparent that anisotropy has been imparted to the compact by the application of pulse magnetic fields.

EXAMPLE 2

A mixture of 100 kg of Sr-ferrite magnetic particles and 500–2000 g of methyl cellulose added with 20 kg of water was kneaded by a kneader, and compacts of different inner and outer diameters were produced by using the extrusion compacting machine used in Example 1. Then the compacts were oriented by orienting means of different diameters, dried and sintered, to provide sintered bodies which were ground by 2 mm per diameter and magnetized to produce magnet rolls. The magnetic properties of the magnet rolls having 8 magnetic poles oriented symmetrically are shown in Table 2.

TABLE 2

| Dimensions of Magnets (mm) | | | Bo (G) on | Bo (G) on |
|---|---|---|---|---|---|
| Outer Dia. | Inner Dia. | Br (G) | Bo (G) on Magnet Rolls | with Gap of 1 mm | Isotopic Magnet Rolls |
| 12 | 6 | 3000 | 1400 | 650 | 1000 |
| 14 | 8 | 3000 | 1400 | 700 | 1100 |
| 16 | 8 | 3100 | 1500 | 750 | 1150 |
| 20 | 8 | 3200 | 1600 | 800 | 1180 |
| 22 | 8 | 3300 | 1700 | 850 | 1200 |
| 24 | 8 | 3300 | 1700 | 900 | 1200 |
| 30 | 10 | 3300 | 1900 | 1200 | 1200 |

The orienting conditions included the use of a pulse current source of JC 200 model made by a firm Institute of Applications of Magnetism for applying voltages ranging from 300 to 900 V. The results show that the magnetic properties of the magnet rolls according to the invention show marked improvements over the magnetic properties of magnetic rolls produced only by extrusion compacting, and the products can meet the requirements set by the customers in the market.

EXAMPLE 3

A mixture of 7 kg of scaly barium ferrite particles (BFP-N, made by Sakai Chemical Company) of a mean particle size of 0.9 μm, 70 g of $SiO_2$ and 100 g of methylcellulose added with 1.5 kg of water was kneaded by means of a kneader and then fed to the extrusion compacting machine used in Example 1, to form compacts of the cylindrical form having an inner diameter of 12 mm, an outer diameter of 30 mm and a length of 300 mm after the formed compacts were cut. Each of the compacts was covered with a vinyl compound sheet and fed to the orienting means shown in FIG. 3, to have a magnetic field of about 20 K Oe applied thereon. After being dried, the compact was sintered and then magnetized to have 8 magnetic poles arranged symmetrically. The ferrite magnets produced had 3500 G in Br and 3600 Oe in IHc. Meanwhile ferrite magnets produced in the same manner as described hereinabove by using ordinary barium ferrite particles of a mean particle size of 0.9 μm had 3300 G in Br and 3500 Oe in IHc. Ferrite magnets produced by extrusion compacting of scaly ferrite particles without applying a pulse magnetic field had 2350 G in Br and 3050 Oe in IHc.

EXAMPLE 4

A mixture of 4 kg of scaly barium ferrite particles (BEP-N, made by Sakai Chemical Company) of a mean particle size of 1.0 μm, 4 kg of barium ferrite particles of a mean particle size of 0.8 μm, 70 g of $SiO_2$ and 100 g of methyl cellulose added with 1.5 kg of water was kneaded by means of a kneader and then fed to the extrusion compacting machine used in Example 1, to form compacts of the cylindrical form having an inner diameter of 12 mm, an outer diameter of 30 mm and a length of 300 mm after the formed compacts were cut. Each of the compacts was covered with a vinyl compound sheet and fed to the orienting means shown in FIG. 3, to have a pulse magnetic field of about 20 K Oe applied thereon. After being dried, worked on and sintered (at 1200–1250° C. for 20 hours), the sintered body was magnetized to have 8 magnetic poles arranged symmetrically. The ferrite magnets produced in this way had 3400 G in Br and 3380 Oe in IHc. In ferrite magnets produced by using only the scaly ferrite particles, Br was 2600 G and IHc was 3400 Oe. However, about twice as much binder and other additive as used in the former was required in producing the latter.

example have substantially the same high magnetic properties.

TABLE 3

| Methyl Cellulose (Wg) | Presence or Absence of Cracks in Compacts | Presence or Absence of Cracks in Sintered Body | Residual Magnetic Flux Density Br (G) |
| --- | --- | --- | --- |
| 20 | Present | Absent | |
| 30 | Present | Absent | |
| 40 | Present | Absent | |
| 50 | Absent | Absent | |
| 60 | Absent | Absent | 3300 |
| 70 | Absent | Absent | ₹ |
| 80 | Absent | Absent | 3400 |
| 90 | Absent | Absent | |
| 100 | Absent | Absent | |
| 110 | Absent | Present | |
| 120 | Absent | Present | |
| 130 | Absent | Present | |

When only the ordinary ferrite particles were used to produce ferrite magnets, the ferrite magnets had only 2250 G in Br and 3350 Oe in IHc. When ferrite magnets were produced by using scaly ferrite particles and without applying a pulse magnetic field on compacts produced by extrusion compacting, the values were 3500 G in Br and 3600 Oe in IHc.

EXAMPLE 5

Mixtures of 10 kg of Sr-ferrite particles of a mean particle size of 1.0 μm, W g of methyl cellulose (W=20, 40, 50, 60, 70, 80, 90, 100, 110, 120 and 130) and 2 kg of methyl alcohol were each kneaded for 60 minutes by means of a kneader of the double-arm type, and each kneaded mixture was subjected to rekneading, deaeration and extrusion by the extruding machine used in Example 1, to obtain a compact of an inner diameter of 10 mm, an outer diameter of 40 mm and a length of 300 mm. In forming compacts by extrusion compacting, the amount of methyl cellulose in the kneaded mixtures was varied from 20 g up to 130 g by 10 g.

Each compact was inserted into the orienting means shown in FIG. 3 and a pulse magnetic field of about 20 K Oe was applied on the surface of the compact to impart anisotropy thereto.

Figure 8:
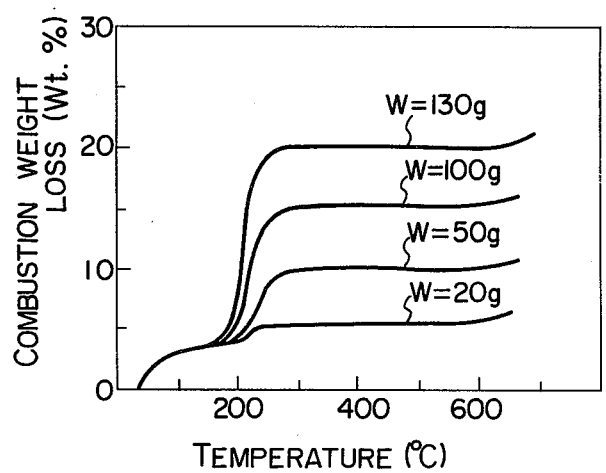
FIG. 8 is a graph showing the relation between temperature and combustion weight loss.

The compacts were dried and then tested for the presence or absence of crack formation. The results obtained are shown in Table 3. That is, it has been ascertained that crack formation occurring when the compacts are dried can be avoided if the amount of the methyl cellulose added to the ferrite particles is over 50 g to increase the viscosity of the kneaded mixture. Then the compacts were tested for the presence or absence of crack formation following sintering under the condition of 1200–1250° C.×20 hr. The results are shown in Table 3. It has been ascertained that crack formation occurring when the dried compacts are sintered can be avoided if the amount of methyl cellulose added to the ferrite particles is below 100 g. It would appear that as can be seen in FIG. 8 which shows changes in the weight of the compacts when the temperature of the compacts rises the weight loss (wt %) due to the combustion of methyl cellulose a 200–250° C. is below 1% and changes in weight per unit time can be reduced, to thereby avoid crack formation. As for magnetic properties, the compacts produced under various conditions had residual magnetic flux density Br in the range between 3300 and 3400 G, as shown in Table 3. It will thus be seen that the all the ferrite magnets produced in this

EXAMPLE 6

A mixture of 7 kg of barium ferrite particles of a mean particle size of 1.0 μm, 70 g of methyl cellulose and 1.5 kg of water was uniformly kneaded by means of a kneader of the batch type, and the kneaded mixture was fed to the extrusion compacting machine used in Example 1. The compact formed by extrusion compacting was cut at the outlet of the metal mold to provide cylindrical compacts having an inner diameter of 12 mm, an outer diameter of 40 mm and a length of 300 mm. The compacts were each covered with a vinyl compound sheet and inserted into the orienting means shown in FIG. 3 for effecting orienting to from 8 symmetrical magnetic poles on the surface by applying a pulse magnetic field thereon. The oriented compact was sintered at 1200°–1250° C. for 20 hours after having been dried. In order to vary the density of the compacts, the reduction in area at the metal mold was varied to produce different types of compacts and operation was carried out under the aforesaid same conditions. The ferrite magnets produced were tested for crack formation and magnetic properties. The results of the tests are shown in Table 4.

TABLE 4

| Density of Compact (g/cc) | Br (G) | BHc | IHc | Presence or Absence of Cracks |
| --- | --- | --- | --- | --- |
| 0.8 | 4000 | 3000 | 3100 | Present |
| 1.3 | 3700 | 2960 | 3140 | Present |
| 2.5 | 3500 | 2750 | 3270 | Absent |
| 2.8 | 3300 | 2630 | 3300 | Absent |
| 3.2 | 3000 | 2600 | 3400 | Absent |
| 3.5 | 2800 | 2450 | 3510 | Absent |

EXAMPLE 7

A mixture of 7 kg of barium ferrite particles of a mean particle size of 1.0 μm and 70 g of methyl cellulose added with 1.5 kg of water was uniformly kneaded by means of a batch type kneader and the kneaded mixture was fed to the extrusion compacting machine used in Example 1, to form a compact. The compact was cut at the outlet of the metal mold to obtain cylindrical compacts of an inner diameter of 12 mm, an outer diameter of 40 mm and a length of 300 mm. Each of the cylindrical compacts was covered with a vinyl compound sheet and inserted into the orienting means shown in FIG. 3. An AC magnetic field was first applied to the compact and then a pulse magnetic field was applied thereon to effect orienting of 8 magnetic poles symmetrically on the outer periphery. After removing the vinyl compound sheet, the compact was dried and sintered at 1200°–1250° C. for 20 hours, and following working on the outer periphery the compact was magnetized by means of a magnetizing yoke to form 8 magnetic poles disposed symmetricaly on the outer periphery. This produced cylindrical ferrite magnets of an outer diameter of 29.3 mm. Similar magnets were produced by applying a pulse magnetic field alone without applying an AC magnetic field to determine the significance of the AC magnetic field and by extrusion compacting alone. These three types of magnets were tested for magnetic properties in the same manner as described by referring to the foregoing examples. The results obtained are shown in Table 5.

TABLE 5

|  | Br (G) | BHc (Oe) | IHc (Oe) |
| --- | --- | --- | --- |
| Extrusion Compacting | 2300 | 2100 | 3600 |
| Pulse Magnetic Field | 3300 | 2900 | 3400 |
| AC and Pulse Magnetic Field | 3500 | 3100 | 3300 |

In Table 5, it will be seen that the ferrite magnets produced by the method according to the invention are far superior in magnetic properties to ferrite magnets produced by methods of the prior art.

The three types of ferrite magnets referred to hereinabove were made into magnet rolls used as with electronic copying apparatus, facsimile systems, etc., and surface magnetic flux density 1.5 $\mu$m above the surface of the magnets was measured. The results obtained are shown in Table 6.

TABLE 6

|  | Surface Magnetic Flux Density (G) |
| --- | --- |
| Extrusion Compacting | 750 |
| Pulse Magnetic Field | 1050 |
| AC and Pulse Magnetic Field | 1120 |

As can be clearly seen in Table 6, the ferrite magnets produced by the method according to the invention are far superior in magnetic properties to ferrite magnets produced by methods of the prior art.

EXAMPLE 8

A mixture of 100 kg of strontium ferrite magnetic power and 500–2000 g of methyl cellulose added with 20 kg of water was kneaded by a kneader and the kneaded mixture was fed to the extrusion compacting machine used in Example 1, to form compacts of an inner diameter of 40 mm, an outer diameter of 100 mm and a length of 500 mm. Then, as shown in FIG. 4, each of the compacts 13 was inserted into the coil 15 mounted in the cylindrical member 14 made of iron which was closed at both ends by the cover 16 made of iron. By using a JC 100 B model pulse current source made by the firm Institute of Applications of Magnetism, a pulse magnetic field for orienting was applied with a voltage of 900 V. In FIG. 4, the numeral 17 designates the pulse current source. The compact was dried and sintered, and then cut by a diamond slicer to produce ring-shaped magnets of an outer diameter of 80 mm, an inner diameter 32 mm and a thickness of 10 mm. Following magnetization, the magnets are tested for magnetic proprties. The results are shown in Table 7.

TABLE 7

| Type of Magnet | Br (G) | IHC | Hc |
| --- | --- | --- | --- |
| Anisotropic | 3300 | 3500 | 2900 |
| Isotropic | 2200 | 3600 | 2000 |

As can be clearly seen in Table 7, the anisotropic magnets produced by the method according to the invention are about 1.5 times as high in magnetic properties as isotropic magnets of the same dimensions. It is added that the magnets produced by the method according to the invention are less expensive by about 30% than the magnets of the prior art produced by means of a press.

EXAMPLE 9

Figure 9:
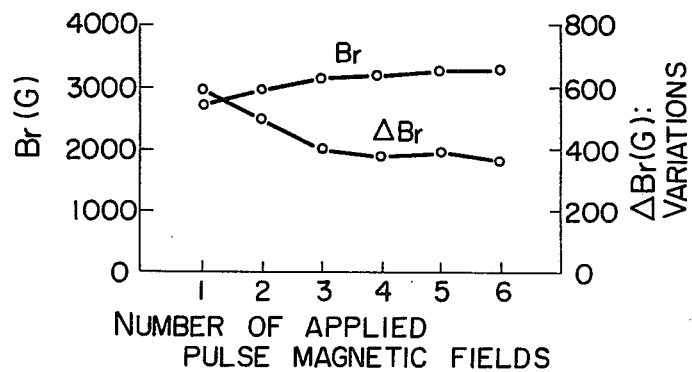
FIGS. 9 and 10 show the relation between the number of applied pulse magnetic fields and magnetic properties when the apparatuses shown in FIGS. 4 and 3 are used, respectively.
Figure 10:
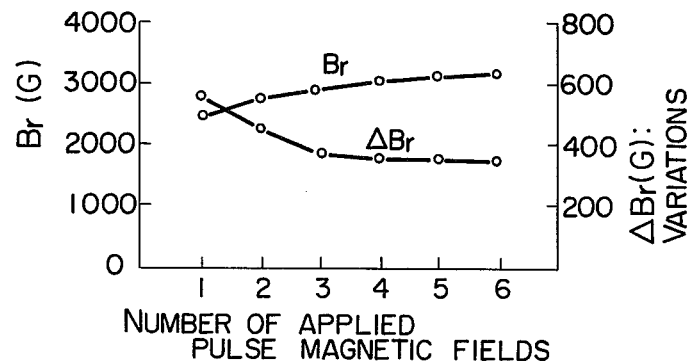

A mixture of 100 kg of Sr-ferrite magnetic powder and 500–2000 g of methyl cellulose added with 20 kg of water was kneaded by a kneader, and the kneaded mixture was fed to the extrusion compacting machine used in Example 1, to form two types of compacts of an inner diameter of 40 mm, an outer diameter of 100 mm and a length of 500 mm and an inner diameter of 32 mm, an outer diameter of 39 mm and a length of 400 mm. The former was inserted into the orienting means shown in FIG. 4 and the latter was inserted into the orienting means shown in FIG. 3 to have a pulse magnetic field applied thereon with a voltage of 800 V by using a pulse current source of TC-100B model made by the firm Institute of Applications of Magnetism, so that orienting can be effected. Following drying and sintering, the former was cut to length of 10 mm and the latter was worked on the outer periphery for 2 mm per diameter. The two types of compacts were formed into ring-shaped magnets for speakers of 80 mm in outer diameter, 32 mm in inner diameter and 10 mm in length and anisotropic magnet rolls with symmetrical 80 magnetic poles 30 mm in outer diameter, 10.7 mm in inner diameter and 320 mm in length, respectively. Magnetic properties and variations thereof with respect to the application of a pulse magnetic field are shown in FIG. 9 (former) and FIG. 10 (latter). It will be clearly seen in the figures that it is necessary to apply at least two pulse magnetic fields, preferably three pulse magnetic fields, to obtain stable magnetic properties.

EXAMPLE 10

A mixture of 100 kg of Sr-ferrite magnetic powder and 500–2000 g of methyl cellulose added with 20 kg of water was kneaded by means of a kneader, and the kneaded mixture was fed to the extrusion compacting machine used in Example 1 to produce compacts of 100 mm in outer diameter and 500 mm in length. Then, as shown in FIG. 4, each of the compacts 13 was inserted into the coil 15 mounted in the cylindrical member 14 made of iron which was closed at both ends by the cover 16 made of iron. Pulse magnetic field orientation was carried out by applying a voltage of 900 V by means of a pulse current source of the JC-100B model made by the firm Institute of Applications of Magnetism. The compacts were dried, sintered and cut by a diamond slicer to produce anisotropic magnets of the ring shape having an outer diameter of 80 mm, an inner diameter of 32 mm and a thickness of 10 mm. Meanwhile the compacts were cut to thicknesses of 10 mm by using a tungsten wire after being oriented, to produce magnets of the same dimensions as the aforesaid ring-shaped magnets after drying, sintering and machining of opposite ends. The two types of anisotropic magnets were tested for magnetic properties. The results are shown in Table 8.

TABLE 8

| Type of Magnet | Br (G) | IHc (Oe) | Hc (Oe) |
| --- | --- | --- | --- |
| Anisotropic (Cut after Sintering) | 3300 | 3400 | 2900 |
| Anisotropic (Cut after Orienting) | 3300 | 3400 | 2900 |
| Isotropic | 2200 | 3600 | 2000 |

In Table 8, it will be seen that no matter what process is used the anisotropic magnets are about 1.5 times as high in magnetic properties as the isotropic magnets in the value of Br. When the compacts are cut following sintering, the magnets can be produced at a cost about 30% less than the cost for producing magnets by means of a press, and the magnets obtained are uniform in magnetic properties.

EXAMPLE 11

A mixture of 7 kg of Sr-ferrite particles of a mean grain size of 1.0 $\mu$, 62 g of BaO, 70 g each of CaO and $SiO_2$ and 70 g of methyl cellulose added with 1.5 kg of water was kneaded in the same manner as described by referring to Example 1, and the kneaded mixture was fed to the extrusion compacting machine used in Example 1 by replacing the metal mold by a new metal mold. The compacts formed were cut at the outlet of the metal mold to produce compacts of the plate form. The ferrite magnets of the plate form were each covered with paper and inserted into orienting means to have a pulse magnetic field of about 10 K Oe applied thereon. After stripping the paper off the compact, the compact was dried, sintered at 1200°–1250° C. for 20 hours, worked on its outer periphery and magnetized. The result was plate-like ferrite magnet of 20 mm in thickness, 100 mm in width and 500 mm in length. The value of Br of this magnet was 3500 G, as compared with the corresponding values of 2600 G of a magnet produced by compression compacting and a magnet produced by extrusion compacting of the prior art. It will be seen that the ferrite magnet of the plate form according to the invention has markedly improved magnetic properties.

What is claimed is:

1. A ferrite magnet of the cylindrical shape having a plurality of magnetic poles on its surface produced by subjecting at least to drying, sintering and magnetizing a mixture comprising magnetoplumbite type ferrite particles as its principal component after such mixture has been subjected to extrusion compacting, wherein said ferrite particles are oriented in anisotropic direction by applying at least one pulse magnetic field on the surface of the compact after the extrusion compacting but before the magnetizing, and the ferrite magnet has a surface magnetic flux density Bo of over 1400 G when it is ground by less than 3 mm in diameter following sintering.

2. A method of producing a ferrite magnet comprising the steps of:

extruding a mixture comprising magnetoplumbite type ferrite particles as its principal component, a mixing medium selected from the group consisting of alcohol and water, an organic binder, and at least one oxide additive selected from the group consisting of PbO, CaO and $SiO_2$ to form a compact;

applying a pulse magnetic field to the surface of the compact to impart anisotropy thereto;

drying the compact formed; sintering the dried compact; and magnetizing the compact in the same direction as the direction in which the anisotropy was imparted to the compact by application of said pulse magnetic field.

3. A method of producing a ferrite magnet as claimed in claim 2, wherein said ferrite particles are non-scaly particles and/or scaly particles of a mean particle size in the range of between 0.7 and 1.5 $\mu$m in diameter.

4. A method of producing a ferrite magnet as claimed in claim 2, wherein an organic binder is added in 0.5 to 2.0 wt % of the ferrite particles thereto.

5. A method of producing a ferrite magnet as claimed in claim 2, wherein said extrusion compacting step is carried out to form a compact having a density in the range between 2.5 and 3.28 g/cc.

6. A method of producing a ferrite magnet as claimed in claim 2, wherein a cylindrical compact is formed in the extrusion step, and at least one pulse magnetic field over about 10 K Oe is impressed on the compact in a direction at a right angle to its verticle axis.

7. A method of producing a ferrite magnet as claimed in claim 2, wherin a cylindrical compact is formed in the extrusion step, and at least one pulse magnetic field over about 10 K Oe is applied on the compact in a direction parallel to its vertile axis.

8. A method of producing a ferrite magnet as claimed in claim 2, wherein an AC magnetic field is applied to the surface of the compact immediately prior to applying said pulse magnetic field.

9. A method of producing a ferrite magnet as claimed in claim 3, wherein the proportion of scaly particles is 30–80 wt %.

10. A method of producing a ferrite magnet as claimed in claim 4, wherein said at least one oxide additive is included in an amount of 0.1–3 wt % of the ferrite particles.

11. A method of producing a ferrite magnet as claimed in claim 2, wherein said mixing medium is included in an amount of 10–30 wt % of te ferrite particles.

12. A ferrite magnet produced by the method of claim 2.

13. A ferrite magnet produced by the method of claim 3.

14. A ferrite magnet produced by the method of claim 10.

15. A ferrite magnet produced by the method of claim 11.

* * * * *